(12) United States Patent
Balinsky et al.

(10) Patent No.: US 8,204,214 B2
(45) Date of Patent: Jun. 19, 2012

(54) METHOD AND SYSTEM FOR GENERATING DATA TRANSACTION ID

(75) Inventors: Helen Balinsky, Cardiff (GB); Weng Wah Loh, Bristol (GB); Liqun Chen, Bristol (GB); Keith Harrison, Monmouthshire (GB); John Waters, Bath (GB)

(73) Assignee: Hewlett-Packard Development Company, L.P., Houston, TX (US)

( * ) Notice: Subject to any disclaimer, the term of this patent is extended or adjusted under 35 U.S.C. 154(b) by 1078 days.

(21) Appl. No.: 11/927,928

(22) Filed: Oct. 30, 2007

(65) Prior Publication Data
US 2008/0122624 A1 May 29, 2008

(30) Foreign Application Priority Data
Oct. 30, 2006 (GB) .................... 0621521.4

(51) Int. Cl.
*H04K 1/00* (2006.01)
*H04L 9/00* (2006.01)
*G06F 7/04* (2006.01)
*H04L 9/28* (2006.01)
*G06Q 20/00* (2012.01)

(52) U.S. Cl. .................. 380/28; 726/26; 705/64; 705/75
(58) Field of Classification Search .................. None
See application file for complete search history.

(56) References Cited

U.S. PATENT DOCUMENTS

| | | | |
|---|---|---|---|
| 5,724,425 A * | 3/1998 | Chang et al. ............ 705/52 |
| 5,910,989 A | 6/1999 | Naccache | |
| 6,044,388 A * | 3/2000 | DeBellis et al. .......... 708/254 |
| 6,195,698 B1 * | 2/2001 | Lillibridge et al. ........ 709/225 |
| 6,996,723 B1 | 2/2006 | Kyojima et al. | |
| 7,251,730 B2 * | 7/2007 | Rose et al. .............. 713/176 |
| 2004/0039919 A1 * | 2/2004 | Takayama et al. ........ 713/180 |
| 2005/0061874 A1 * | 3/2005 | Mathewson et al. ...... 235/383 |
| 2005/0071231 A1 | 3/2005 | Beenau et al. | |
| 2006/0106704 A1 * | 5/2006 | Prasad et al. ............ 705/35 |
| 2006/0154631 A1 * | 7/2006 | Nakano et al. .......... 455/181.1 |
| 2006/0190231 A1 * | 8/2006 | Malloy et al. ............ 703/14 |
| 2010/0238811 A1 * | 9/2010 | Rune .................... 370/248 |

FOREIGN PATENT DOCUMENTS
DE 19523654 A1 1/1997

OTHER PUBLICATIONS

Menezes et al. (Handbook of Applied Cryptography), 1997, CRC Press, Chapter 11.*
GB Search Report dated Jan. 29, 2007 for GB0621521.4.

* cited by examiner

*Primary Examiner* — Matthew Henning

(57) ABSTRACT

A method for generating a data transaction ID for an interaction between first and second units, the method comprising: the first data unit generating a first data item as a function of a first time data element, the first time data element being representative of a first time value, and transmitting the first data item to the second data unit; the second data unit generating a second data item as a function of the received first data item and transmitting the second data item to the first data unit; and the first data unit generating a third data item as a function of the second data item and a second time data element, the second time data element being representative of a second time value, wherein the third data item comprises a transaction ID unique to the interaction between the first and second data units.

14 Claims, 4 Drawing Sheets

US 8,204,214 B2

METHOD AND SYSTEM FOR GENERATING DATA TRANSACTION ID

CROSS REFERENCE TO RELATED APPLICATIONS

This application claims priority from co-pending United Kingdom utility application entitled, "Method and System for generating data transaction ID" having serial no. GB 0621521.4, filed Oct. 30, 2006, which is entirely incorporated herein by reference.

BACKGROUND

As RFID tags become increasingly ubiquitous in their use in conjunction with the growing range of applications, it is increasingly common for such RFID tags to be used to record a data transaction event between the RFID tag and an appropriate read/write device. By recording the data transaction events a data log of the transactions that includes, amongst other data items, the dates and times of the data transactions can be created that can be used as evidence of the completion of the data transactions. Examples of uses of RFID tags in this manner may involve a portable read/write device being used to complete data transactions between multiple RFID tags, each of which are fixed to separate items, the read/write device maintaining a data log of those items that have been physically visited by the read/write operator such that it can be later verified that all necessary items have been physically visited. For example, this arrangement may be used to verify that all fire extinguishers equipped with an RFID tag have been physically examined by a fire safety officer equipped with a suitable read/write device, alternatively a similar arrangement could be used to verify that a service engineer has physically visited (and thus presumably checked) the appropriate RFID tag equipped machinery, the data log providing the basis for proof of completion of paid for service tasks. In these latter examples, it is advantageous for the read/write device operator not to be able to falsify the data transaction between the read/write device and the respective RFID tags so as to prevent fraudulent work claims being made. For example, it is desirable that it is not possible to falsify the date and/or times at which a data transaction between the read/write device and an RFID tag has been made.

OVERVIEW

According to a first aspect of the present invention there is provided a method for generating a data transaction ID for an interaction between a first and a second data unit, the method comprising the first data unit generating a first data item as a function of a first time data element, the first time data element being representative of a first time value, and transmitting the first data item to the second data unit, the second data unit generating a second data item as a function of the received first data item and transmitting the second data item to the first data unit and the first data unit generating a third data item as a function of the second data item and a second time data element, the second time data element being representative of a second time value, wherein the third data item comprises a data transaction ID unique to the interaction between the first and second data units.

The generation of the first and third data item may also a function of a first secret data value associated with the first data unit and the generation of the second data item may also be a function of a second secret data value associated with the second data unit. Consequently the method may further comprise generating the first data item by combining the first time data element and the first secret data value and performing a hashing operation on said combination, generating the second data item by performing a hashing operation on a combination of the first data item and the second secret data value and generating the third data by combining the second data item, the second time data element and the first secret data value and performing a hashing operation on said combination.

The first and second time data elements may be generated according to a pseudo-random number series having a one-to-one correspondence to an actual time. In other words, for a given real time and with knowledge of the pseudo-random number series it is possible to calculate the corresponding pseudo-random number.

The method may further comprise associating a first data unit identification code, a second data unit identification code and first and second real time values with the generated data transaction ID.

According to a further aspect of the present invention there is provided a method of validating a data transaction ID generated according to the previously mentioned aspect of the invention comprising determining the first and second time data elements corresponding to the associated first and second real time values generating a validation transaction ID by performing a sequence of hashing operations on one or more of the determined first and second time data elements and the first and second secret data values associated to the first and second data unit identification codes respectively, the sequence of hashing operations being identical to those performed to generate the data transaction ID and validating the data transaction ID only if it is equal to the validation transaction ID.

Preferably, prior to generating the validation transaction ID the difference between the first and second real time values may be determined and if the difference is greater than a predetermined time value the data transaction ID is deemed invalid.

According to another aspect of the present invention there is provided a system for generating a data transaction ID comprising first and second data processors, the first data processor being arranged to generate a first time data element representative of a first time value, generate a first data item as a function of the first time data element and transmit the first data item to the second data processor, the second data processor being arranged to generate a second data item as a function of the first data item and transmit the second data item to the first data processor, the first data processor being further arranged in response to receiving the second data item to generate a second time data element representative of a second time value and generate a third data item as a function of the second time data element and the second data item.

The first data processor may comprise data storage having a first secret data value stored therein and the first and third data item is generated as a function of said first secret data value and wherein the second data processor comprises data storage having a second secret data value stored therein and the second data item is generated as a function of said second secret data value.

Additionally, the first data processor may be arranged to generate the first data item by combining the first time data element and the first secret data value and perform a hashing operation on the resultant combined value and is further arranged to generate the third data item by combining the second data item, the second time data element and the first secret data value and performing a hashing operation on the resultant combined value, and wherein the second data processor is arranged to generate the second data item by combining the first data item and the second secret data value and performing a hashing operation on the resultant combined value. The combining operation may comprise any one or more of concatenation, XOR-ing and AND-ing.

The first data processor may be arranged to generate said time data elements according to a predetermined pseudo-random number sequence.

The first and second data processors preferably comprise physically separate devices. Preferably the second data processor comprises an RFID tag and the first data processor comprises an RFID tag read/write device.

According to a further aspect of the present invention there is provided a system for validating a data transaction ID generated by the previously mentioned system, the system comprising a validation data processor arranged to receive from the first data processor a data transaction ID, first and second time values associated with the data transaction ID and first and second data processor identification codes and arranged to generate first and second time data elements corresponding to the received first and second time values, generate a validation transaction ID by performing a sequence of transformations on one or more of the first and second time data elements and the first and second secret data values associated to the first and second data processor identification codes, the sequence of transformations being identical to those performed to generate the data transaction ID and validate the received data transaction ID only if it is equal to the validation transaction ID.

The validation processor may be arranged to determine the difference between the received first and second time values prior to generating the validation transaction ID and if the difference is greater than a predetermined time value to declare the data transaction ID invalid.

BRIEF DESCRIPTION OF DRAWINGS

Embodiments of the present invention will now be described, by way of illustrative example only, with reference to the accompanying figures, of which.

DETAILED DESCRIPTION

Figure 1:
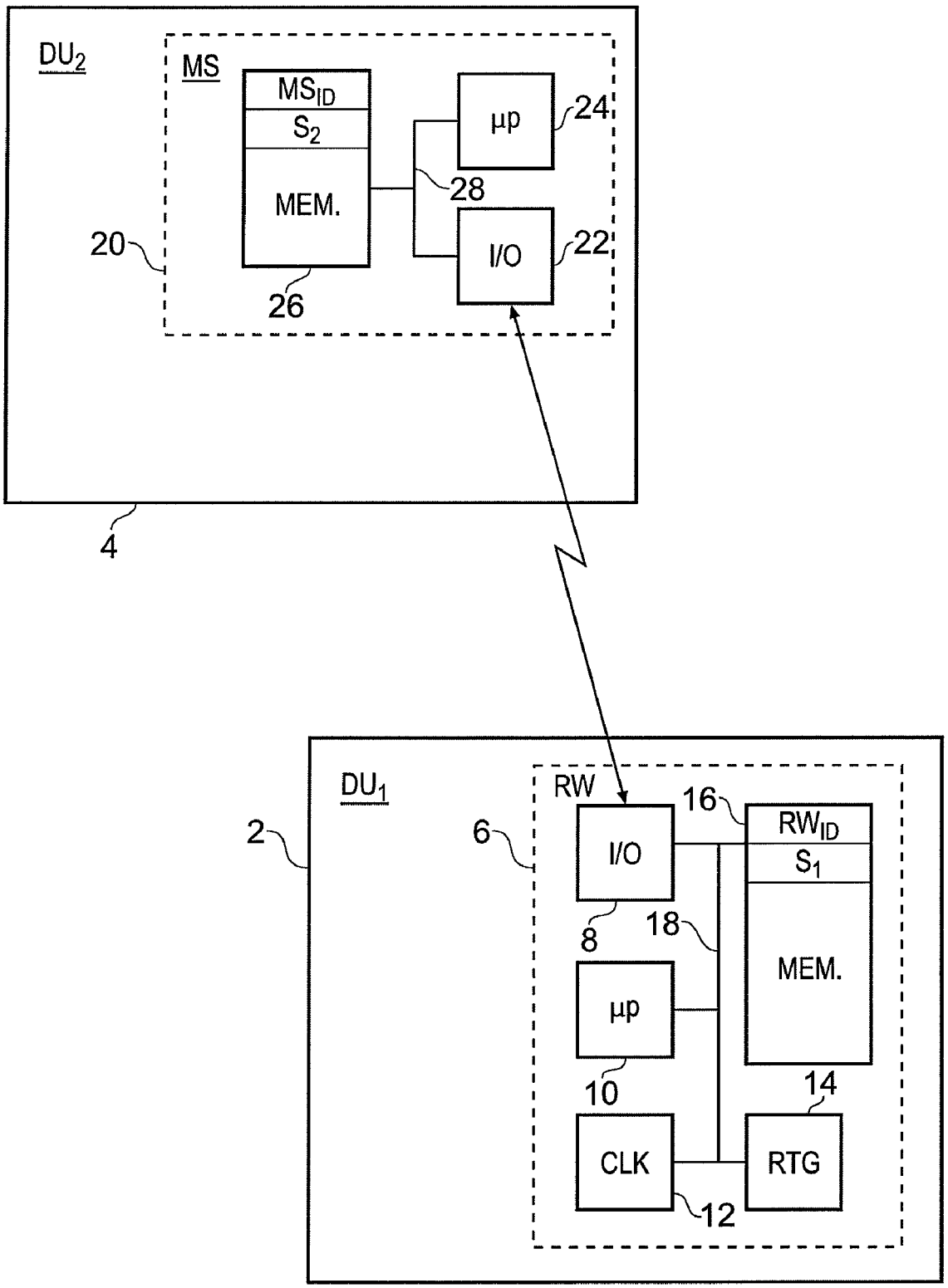
FIG. 1 schematically illustrates the components of a read/write device and an memory tag suitable for use in embodiments of the present invention.

FIG. 1 schematically illustrates first and second data units 2, 4 between which a data transaction may occur. The first data unit 2 includes a read/write apparatus 6 according to an embodiment of the present invention. The read/write apparatus includes an input/output interface 8, a first data processor 10, a clock 12, a random time generator 14 and a memory module 16, all of which are connected to one another by means of an appropriate data bus 18. The memory module 16 has a read/write data item stored therein that uniquely identifies the read/write device within the first data unit and in the embodiment illustrated also has a first "secret" $S_1$ stored therein, the first secret $S_1$ may comprise another unique number of code. The memory module 16 also includes capacity for general data storage.

The second data unit 4 includes an memory tag 20, such as a "memory spot" for example, which is a proprietary RFID tag manufactured by the current applicant. The memory tag includes a second input/output interface 22, a second data processor 24 and a second memory module 26, all of which are connected to each other via second data bus 28. The second memory module 26 has a unique memory spot identification code stored therein, together with a second "secret" $S_2$ and general data storage means.

Figure 2:
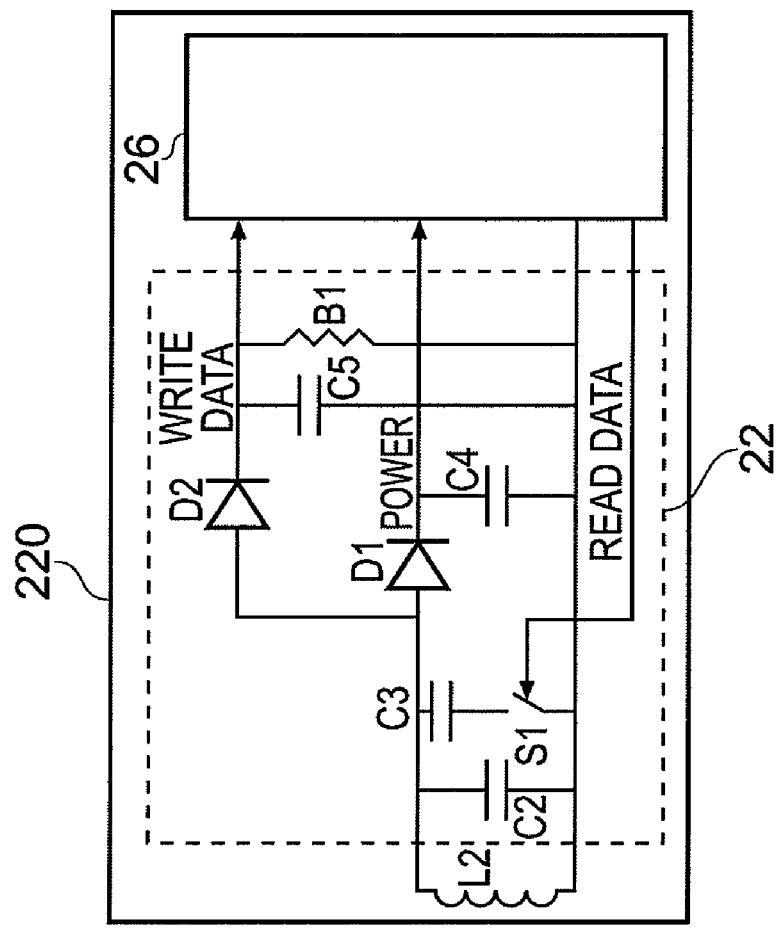
FIG. 2 schematically illustrates an implementation of the memory tag and reader/writer illustrated in FIG. 1.
Figure 2:
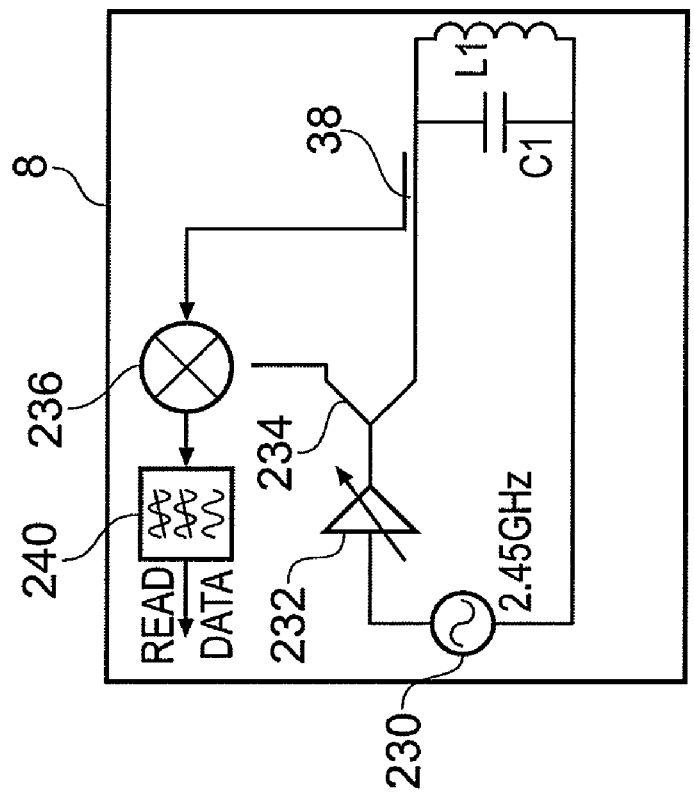

Referring now to FIG. 2, an example of the possible circuitry 220 of a memory tag 4 and exemplary circuitry of the I/O interface 8 of a read/write device 6 (not shown) are illustrated schematically, using conventional component identifications (C-capacitor, L-inductance, R-resistor, D-diode and S-switch). In an embodiment, the input/output interface 22 of the memory tag 14 comprises an RF transponder circuit including a capacitor C2 which, in combination with an antenna coil L2, forms a resonant circuit with component values being chosen to tune the combination to a frequency of approximately 2.45 GHz (for example) for inductive coupling with the read/write device. The portion of transponder circuit responsible for power supply is diode D1 and capacitor C4, with diode D1 rectifying the alternating current generated by the inductive coupling and the capacitor C4 acting as a power supply storage. The portion of the transponder circuit responsible for receiving transmitted data from the read/write device is diode D2, capacitor C5 and resistor R1 which form a simple envelope detector. The data thus received is stored in memory 26. The portion of the transponder circuit responsible for the reading of data from the memory 26 is the tuned circuit L2/C2 in combination with S1 and C3. Switching C3 in and out of the circuit using S1 changes the resonance of tuned circuit L2/C2 resulting in phase modulation of the reflected power from the memory tag 14 to a read/write device.

An example of the implementation of the first and second data units 2, 4 is the first data unit 2 comprising a handheld computing device, such as a PDA or laptop computer, and the second data unit 4 comprising a computer printer. The handheld read/write device is thus likely to be used by a service engineer who is tasked with inspecting and/or servicing one or more computer printers, as represented by the second data unit 4. To confirm that a particular printer has been serviced a data transaction occurs between the read/write device (first data unit 2) and the memory tag 20 located on the printer (second data unit 4). In the illustrated embodiment in FIG. 1 the necessary data communication goes between the first and second input/output units 8, 22 and will occur by means of inductive coupling. However, it will be appreciated that other wireless transmission techniques may be employed and in some embodiments non-wireless communication may be utilised.

Prior to being issued to an operator, the read/write device 6 must first be initialised by the third party issuing the read/write device to the end user. In the example previously given, the third party issuing the read/write device would be the party responsible for making payment to the service engineer for performing the service checks on the computer printers. So the third party could be the engineers employer or alternatively the owner of the computer printers that will be making payments on the basis of a service contract with the service engineer. The initialisation process involves loading the read/write ID and the first secret $S_1$ onto the memory module 16 of the read/write device. The initialisation process also involves initialising the random time generator 14. This is accomplished by recording the real time at which the random time generator is initialised. The random time generator generates a series of pseudo-random numbers, which may or may not be in an accepted time format, at discrete time intervals. The means by which the pseudo-random numbers are generated preferably utilises cryptographic algorithms that render it extremely difficult to determine the actual order of the pseudo-random number series or to generate a false pseudo-random number. The pseudo-random number series preferably has a one-to-one correspondence to an actual time. In other words, for a given real time and with knowledge of the pseudo-random number series it is possible to calculate the corresponding pseudo-random number. The read/write device ID, the first secret $S_1$ and the actual time at which the random time generator was initialised are all recorded and maintained in a secure database by the initialising third party.

Figure 3:
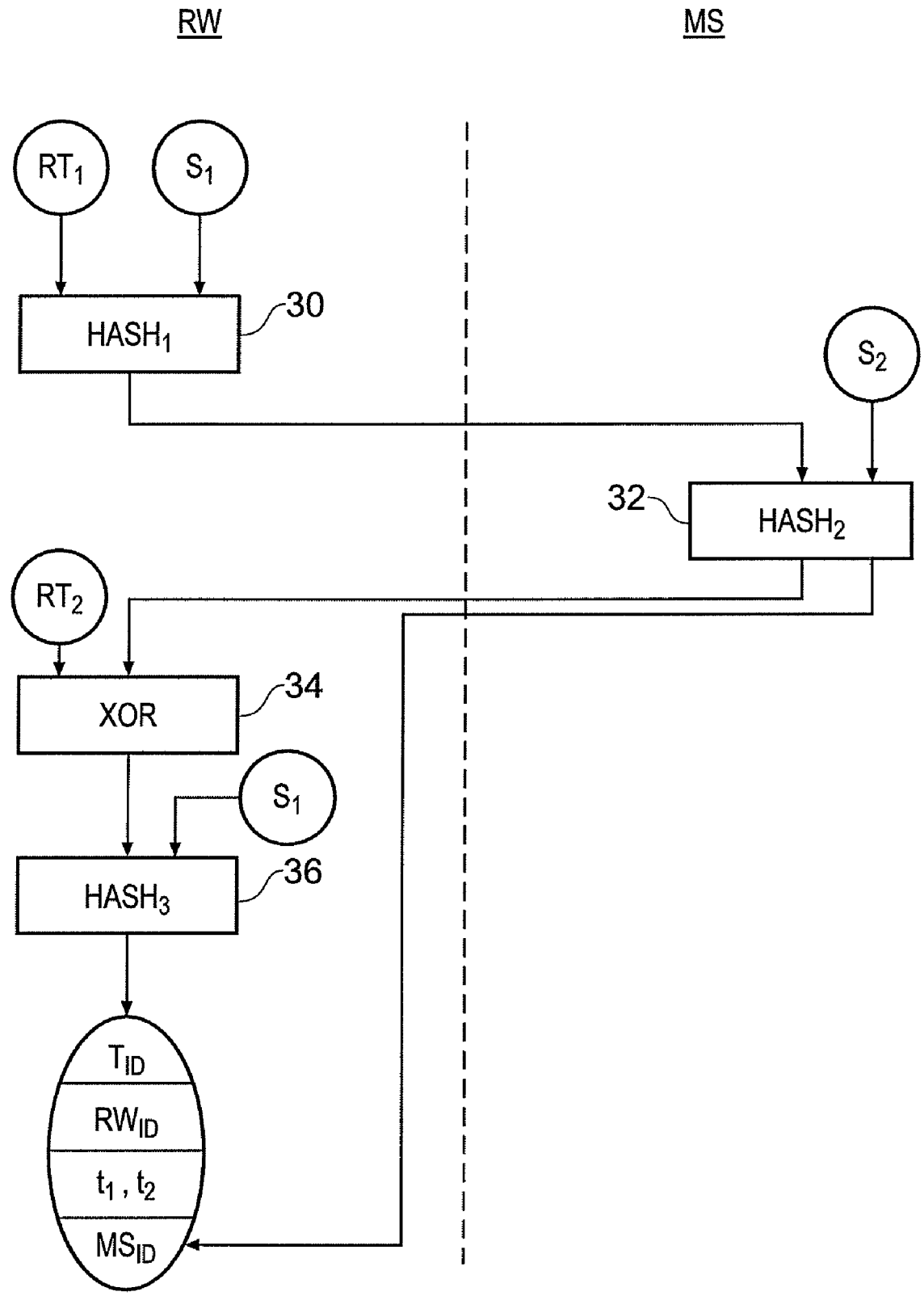
FIG. 3 schematically illustrates the generation of a transaction ID according to an embodiment of the present invention.

FIG. 3 schematically illustrates a process and data flow for generating a transaction ID for a data transaction between the read/write device and the memory spot illustrated in FIG. 1. The left hand side of FIG. 3 illustrates the data flows and processing steps that occur in the read/write device 6, whilst the right hand side of FIG. 3 illustrates the data flows and processing steps that occur within the memory tag 20. To generate a data transaction ID, $T_{ID}$ a first hashing operation is performed on the first secret $S_1$ and a first random time value, $RT_1$ which is representative of a first time value. In the particular embodiment illustrated in FIG. 3 the first random time value $RT_1$ is concatenated with the first secret $S_1$ and the resulting data word is then hashed in the first hashing operation to provide a hash output. The hashed output from the first hashing operation 30 is transmitted from the read/write device 6 to the memory tag 20, where it is combined with the second secret $S_2$ that is stored in the memory module 26 of the memory tag and the combined data value is further hashed in a second hashing operation 32 to provide a second hash output. The second hashed output is transmitted from the memory tag to the read/write device, together with the unique memory tag identification code, $MS_{ID}$. In the embodiment illustrated in FIG. 3 the second hashed output is XORed with a second random time value $RT_2$, which is representative of a second real time value. By XORing the second random time value and the second hashed output from the memory tag a data word is generated at step 34, which is then concatenated with the first secret $S_1$ and the concatenated value is hashed again in a third hashing operation 36. The result of the third hashing operation comprises the unique transaction ID, $T_{ID}$ that is, for example, subsequently stored in the memory module 16 of the read/write device 6, together with the memory tag identification code $MS_{ID}$ and the real times $t_1$, $t_2$ that correspond to the random time values $RT_1$ and $RT_2$. The real time values $t_1$ and $t_2$ are either derived directly from the random time data values or are read in real time from the separately provided clock 12 included in the read/write device 6. The read/write ID is also stored with the transaction ID. Since the process of generating the transaction ID utilises two separate time related values, each transaction ID will be unique to a particular data transaction. Furthermore, since each transaction ID is derived from two time elements and two secret values associated respectively with the memory tag and read/write device, the transaction ID proves that the specified read/write device was used on the specified memory tag at the specified time.

Figure 4:
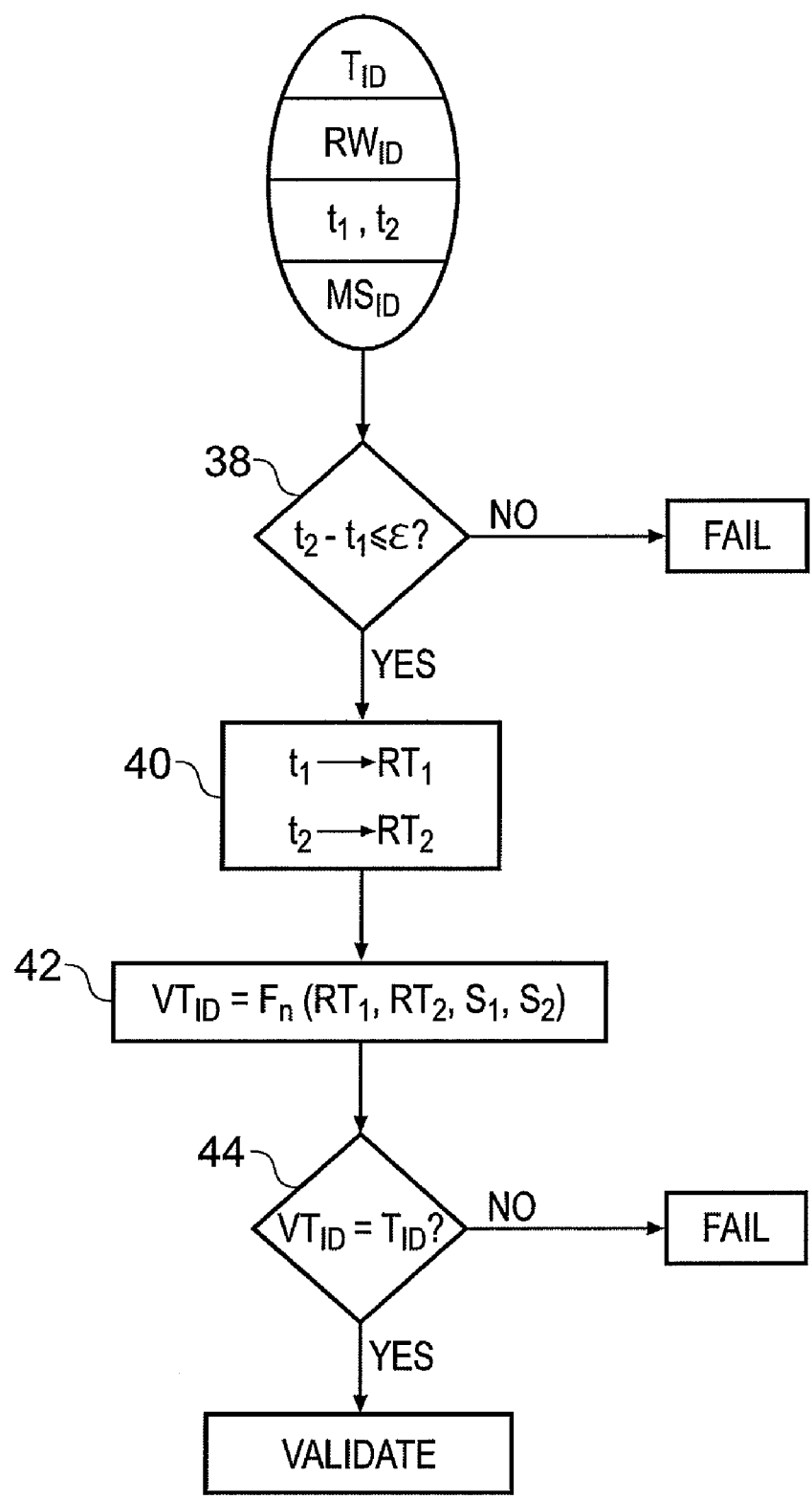
FIG. 4 schematically illustrates the method of validating a data transaction ID according to an embodiment of the present invention.

Once a transaction ID has been generated and recorded it may subsequently be validated by the third party that issued the read/write device. The method of validating a transaction ID is schematically illustrated into FIG. 4. The transaction ID $T_{ID}$, read/write device ID $RW_{ID}$, the memory tag identification $MS_{ID}$ and the real time values used during the generation of the transaction ID are all provided from the memory of the read/write device. An initial step 38 is to calculate the difference between the second and first time values, since this is indicative of the time taken to generate the transaction ID. For the transaction to be valid the difference between the first and second real time values should be no greater than a predetermined maximum, for example 1-2 seconds, since the time taken for the transaction ID to be generated by the read/write device should be minimal. If the difference between the time values is greater than the predetermined maximum then this is indicative that the transaction ID was generated fraudulently and in fact was not generated during a real time data transaction between the read/write device and the memory tag. Consequently if the time difference is greater than the predetermined value the verification process is considered to be a fail. If the difference between the first and second to real time values is less than the predetermined maximum, and is thus acceptable, the pseudo-random time values corresponding to the real time values are generated, as illustrated at step 40. This is possible since the real time at which the random time generator 14 of the particular read/write device identified by the read/write ID is known by the verifying body and thus the value of the pseudo-random time sequence corresponding to the respective real times recorded during the transaction process can be calculated. Having obtained the first and second random time values $RT_1$ and $RT_2$, the sequence of hashing operations utilising these values and the first and second secrets $S_1$ and $S_2$, which are also recorded by the verifying authority, can be repeated, as represented at stage 42 in FIG. 4 the repetition of the hashing sequence thus independently generates a transaction ID value referred to as the verification transaction ID $VT_{ID}$. This value is compared to the recorded transaction ID provided by the read/write device, step 44 and only if the two values are exactly the same, i.e. $VT_{ID}=T_{ID}$, is the transaction ID fully verified. Once the transaction has been verified a payment of the service operator, using the previous example, may be authorised.

The method and apparatus of generating and validating a data transaction ID according to the above described embodiments provides an extremely secure system for validating that certain claimed data transaction have indeed taken place. Examples of possible applications include warranty and/or service claims, where the person performing the service or warranty action cannot necessarily be trusted. In this instance a claim ID (data transaction ID) must be generated by the individual for every service/warranty action for which payment is requested. Therefore it is important that false claim IDs cannot be generated, even in the absence of access to a users central computer network, something embodiments of the present invention prevents by use of the time data elements. A further application is in the field of health care, where the data transaction ID can be used to provide a secure record that a particular drug has been administered to a patient or has been taken from a dispensary by a particular individual.

The invention claimed is:

1. A method for generating a data transaction ID for an interaction between first and second data units, the method comprising:

the first data unit, by operation of a hardware processor, generating a first data item as a function of a first time data element, the first time data element being representative of a first time value associated with the generating of the first data item, and transmitting the first data item to the second data unit;

the second data unit generating a second data item as a function of the received first data item and transmitting the second data item to the first data unit;

the first data unit generating, by the hardware processor, a third data item as a function of the second data item and a second time data element, the second time data element being representative of a second time value associated with the generating of the second time data element, wherein the third data item comprises a transaction ID unique to the interaction between the first and second data units, and the first data unit associating and storing in a memory a first data unit identification code, a second data unit identification code, and the first and second time values with the generated transaction ID;

wherein the generation of the first and third data items are functions of a first secret data value unique and secret to the first data unit and the generation of the second data item is also a function of a second secret data value unique and secret to the second data unit.

2. The method according to claim 1 further comprising:

generating the first data item by combining the first time data element and the first secret data value and performing a hashing operation on said combination;

generating the second data item by performing a hashing operation on a combination of the first data item and the second secret data value; and generating the third data item by combining the second data item, the second time data element and the first secret data value and performing a hashing operation on said combination.

3. The method according to claim 1, wherein the first and second time data elements are generated according to a pseudo-random number series.

4. The method of claim 1 further comprising validating the transaction ID, the validating including:

determining the first and second time data elements corresponding to the associated first and second real time values;

generating a validation transaction ID by performing a sequence of hashing operations on one or more of the determined first and second time data elements and the first and second secret data values associated to the first and second data unit identification codes respectively, the sequence of hashing operations being identical to those performed to generate the data transaction ID; and validating the data transaction ID only if it is equal to the validation transaction ID.

5. The method of claim 4, wherein prior to generating the validation transaction ID the difference between the first and second real time values is determined and if the difference is greater than a predetermined time value the data transaction ID is deemed invalid.

6. A system for generating a data transaction ID comprising:

a hardware processor; and a second processor;

the hardware processor to generate a first time data element representative of a first time value, generate a first data item as a function of the first time data element, and to transmit the first data item to the second processor, the second processor to generate a second data item as a function of the first data item and transmit the second data item to the hardware processor, the hardware processor, in response to receiving the second data item to:

generate a second time data element representative of a second time value;

generate a third data item as a function of the second time data element and the second data item wherein the third data item is unique to the transaction between the hardware processor and the second processor; and store in a data storage the generated third data item, and a first data unit identification code, a second data unit identification code, and the first and second time values associated with the third data item;

wherein the data storage includes a first secret data value unique and secret to the hardware processor, the first and third data items generated as a function of said first secret data value; and wherein the second processor comprises data storage having a second secret data value stored therein, the second secret data value being unique and secret to the second processor, the second processor to generate the second data item as a function of said second secret data value.

7. The system of claim 6, wherein the hardware processor is arranged to generate the first data item by combining the first time data element and the first secret data value and perform a hashing operation on the resultant combined value and is further arranged to generate the third data item by combining the second data item, the second time data element and the first secret data value and performing a hashing operation on the resultant combined value, and wherein the second processor is arranged to generate the second data item by combining the first data item and the second secret data value and performing a hashing operation on the resultant combined value.

8. The system of claim 7, wherein said combining operation comprises anyone or more of concatenation, XOR-ing and AND-ing.

9. The system of claim 6, wherein the hardware processor is arranged to generate said time data elements according to a predetermined pseudo-random number sequence.

10. The system of claim 6, wherein the hardware processor and the second processor comprise physically separate devices.

11. The system of claim 6, wherein the second processor comprises an RFID tag.

12. The system of claim 11, wherein the hardware processor comprises an RFID tag read/write device.

13. A system to validate a data transaction ID pertaining to a data transaction between a hardware processor and a second processor, the system comprising a validation data processor to receive from the hardware processor a data transaction ID, first and second time values associated with the data transaction ID, and first and second processor identification codes associated with the hardware processor and the second processor, the system to:

generate first and second time data elements corresponding to the received first and second time values;

generate a validation transaction ID by performing a sequence of transformations on the first and second time data elements and first and second secret data values associated to the first and second processor identification codes, the first and second secret data values being unique and secret to the hardware processor and the second processor respectively, the sequence of transformations being identical to a sequence of transformations performed by the hardware processor to generate the data transaction ID; and validate the received data transaction ID only if it is equal to the validation transaction ID.

14. The system of claim 13, wherein the validation processor is to determine a difference between the received first and second time values prior to generating the validation transaction ID and if the difference is greater than a predetermined time value to declare the data transaction ID invalid.

* * * * *